United States Patent [19]

Dohany

[11] 4,360,652

[45] Nov. 23, 1982

[54] METHOD OF PREPARING HIGH QUALITY VINYLIDENE FLUORIDE POLYMER IN AQUEOUS EMULSION

[75] Inventor: Julius E. Dohany, Tredyffrin, Pa.

[73] Assignee: Pennwalt Corporation, Philadelphia, Pa.

[21] Appl. No.: 297,582

[22] Filed: Aug. 31, 1981

[51] Int. Cl.³ .............................................. C08K 5/05
[52] U.S. Cl. .................................. 526/210; 526/255; 524/545; 524/805
[58] Field of Search ........................................ 526/210

[56] References Cited

U.S. PATENT DOCUMENTS 3,061,401 12/1962 Gallagher .......................... 260/87.7
3,839,305 10/1974 Moore .............................. 260/80.77
3,857,827 12/1974 Dohany ............................. 260/92.1
4,092,470 5/1978 Oosterwijk et al. ................ 526/227

Primary Examiner—Joseph L. Schofer
Assistant Examiner—Bernard Lipman

[57] ABSTRACT

Vinylidene fluoride polymers of high quality are prepared consistently by an emulsion polymerization process in which the monomer, chain transfer agent (isopropyl alcohol), and an aqueous emulsion of the initiator (diisopropylperoxydicarbonate) containing a fluoro surfactant of a limited class are fed incrementally to an aqueous reaction medium containing a fluoro surfactant.

9 Claims, No Drawings

METHOD OF PREPARING HIGH QUALITY VINYLIDENE FLUORIDE POLYMER IN AQUEOUS EMULSION

BACKGROUND OF THE INVENTION

The emulsion polymerization at moderate pressure of vinylidene fluoride using fluorinated surfactant and, as a free-radical initiator, diisopropyl peroxydicarbonate (hereinafter referred to as IPP) is taught in U.S. Pat. No. 3,475,396 dated Oct. 28, 1969. The same patent teaches that the amount of fluorinated surfactant necessary in the system can be reduced if a chain transfer agent, i.e. a water-soluble organic compound, is present in the reaction system. The process was further refined in U.S. Pat. No. 3,857,827 dated Dec. 31, 1974 wherein a particularly high molecular weight product was produced in a relatively fast reaction by a procedural modification wherein IPP initiator in a solution of acetone (the acetone acting both as a solvent for the IPP and as a chain transfer agent) was added incrementally (or continuously) to the reaction system simultaneously with and proportionately to the incremental (or continuous) addition of monomer. The present invention provides another procedural modification to attain a product of high molecular weight in a relatively fast reaction; additionally, the present process avoids the need to recover relatively large quantities of acetone to avoid environmental objections and the product of the present invention has improved stability toward discoloration upon aging, particularly in the presence of heat compared to the product of the '827 patent.

THE INVENTION

The present invention provides a process for preparing vinylidene fluoride polymer by emulsion polymerization of monomer in a stirred aqueous reaction medium containing a fluoroalkyl surfactant emulsifier, using IPP as the polymerization initiator and using isopropyl alcohol (hereinafter IPA) as a chain transfer agent wherein monomer, IPP and IPA are added separately but simultaneously to the polymerization system incrementally or continuously over the polymerization cycle, the IPP being added as an aqueous emulsion in which a fluorosurfactant readily soluble in cold water and capable of emulsifying the IPP for the duration of the polymerization cycle is present as an emulsifying agent. The IPA is added as a dilute aqueous solution. The invention will be more readily understood by reference to the flow sheet which follows:

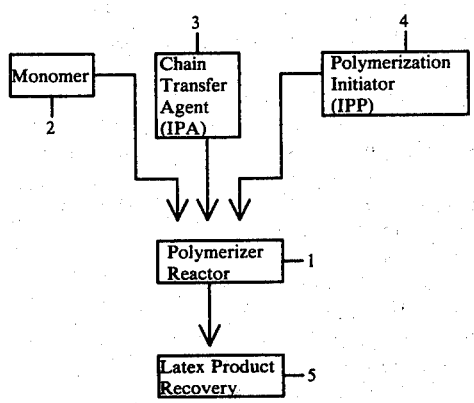

Referring particularly to the flow sheet; pressurized polymerizer 1 equipped with a stirrer and heat control means, is initially charged with deionized water containing from 0.05 to 0.5 weight percentage based on the weight of monomer to be charged to the polymerizer of a conventional fluorosurfactant (such as those taught in U.S. Pat. No. 2,559,752 or U.S. Pat. No. 3,239,970). Preferably the surfactant is employed at a concentration of from 0.1 to 0.2 percentage. Thereafter the atmosphere of the polymerizer is subjected to a series of evacuations and nitrogen purges to ensure an oxygen-free environment for the polymerization and the system is sealed, agitated and brought to the desired reaction temperature (e.g. between 60° to 90° C., preferably 70° to 80° C.). Monomer from 2 is then added until the operable pressure (300 to 1000 psig and preferably 400–700 psig) is obtained. Thereafter an initial charge of the chain transfer agent (an amount of agent equal to about 0.2% to 1% by weight of monomer in the initial charge, added as an 1% to 10% by weight aqueous solution) is charged into the polymerizer from 3. Polymerization is then begun by adding an incremental charge of polymerization initiator from source 4 or by simultaneously adding incremental charges or continuous feeds of monomer, chain transfer agent and, polymerization initiator. Thereafter, incrementally or continuously, monomer, chain transfer agent and polymerization initiator are fed simultaneously in a constant ratio and at a rate which provides an essentially constant pressure within the polymerizer. Upon completion of the polymerization, the product is recovered as a latex, at 5, which latex can optionally be concentrated by creaming or flash evaporation or the latex can be coagulated and the polymer recovered as a powder.

The invention will be more readily understood by reference to the Examples which are added by way of illustration and which are not indicated to limit the invention in any manner.

EXAMPLE 1

A two gallon horizontal stainless steel autoclave equipped with a paddle agitator is charged with 5145 ml deionized water, 175 ml of a 1 weight percent aqueous solution of fluoro surfactant (the ammonium salt of a mixture of fluoro telemer acids of the formula $(CF_3)_2CF(CF_2CF_2)_n CF_2COOH$ where n is 2 and 3, known also under the trademark Pentel 3609 produced by Pennwalt Corporation) and 22 grams of paraffine wax having a melting point of 135° F. (a conventional latex stabilizer used to aid in inhibiting coagulation and adhesion of polymer to the reactor walls, sold under the trademark Mobil Wax 135 by the Mobil Oil Company).

The reactor is sealed, evacuated, purged with nitorgen, reevacuated and the vacuum broken with some vinylidene fluoride monomer to slightly above atmospheric pressure. Agitation is started and the reactor charge is heated to 75° C. and then pressurized to 650 psig by the addition of about 453 gram of vinylidene fluoride monomer which amount is 19.75 weight percent of the total monomer ultimately to be fed to the reactor during the planned polymerization cycle. At this point 32 ml of solution containing 9.2 volume percent isopropyl alcohol in deionized water is added to the reactor by a positive displacement pump. Initiation of the polymerization is then induced by pumping 32 ml of an IPP emulsion containing 0.3 weight percent fluoro surfactant (known by the trademark Surflon S111S and produced by Assahi Glass Company, Ltd. of Japan) and 10 weight percent IPP, each based on the weight of the initiator emulsion; the initiator emulsion was prepared with the help of a non-aerating high speed stirrer. Ten minutes after the IPP emulsion was pumped into the reactor a drop in pressure in the reactor of 10 psig signified start of the polymerization. Thereafter continuous feeding of monomer, chain transfer agents solution, and initiator emulsion was begun, the monomer feed rate being about 567 grams per hour and the feed rate of initiator emulsion injection being 5 to 18 ml per hour to sustain the pressure at 650 psig; simultaneously the chain transfer agent solution was pumped into the reactor at the rate of about 39 ml per hour to keep the ratio of monomer weight fraction consumption versus chain transfer weight fraction constant.

After 3 hours 20 minutes feed time, the total feed to the reactor was 2298 grams of monomer, 150 ml of 10 weight percent IPP emulsion in water (equivalent to 6.58 g IPP per kilogram monomer) and 15 ml isopropyl alcohol in 147 ml water (equivalent to 5.12 g isopropyl alcohol per kilogram monomer). The average polymerization was 104 gram per liter per hour and the maximum rate was 128 grams per liter per hour. Upon completion of the reaction, the agitation was stopped, the reactor contents were cooled to 50° C., residual monomer was vented, and the latex product was drained from the reactor. The latex contained 27.9 percent of polymer solids (2,076 grams polymer), a yield of 90.3 percent. Vinylidene fluoride polymer recovered from the latex had a melt viscosity of 10,653 poise at 100 reciprocal seconds.

EXAMPLE 2

The procedure of Example 1 was substantially followed except that Surflon S111S substituted for Pentel 3609 in the initial water charged into the reactor. Batch time for this batch was 3 hours 45 minutes at an average polymerization rate of 92 grams per liter per hour and the maximum polymerization rate was 107 grams per liter per hour. The IPP consumption was 6.36 gram per kilogram monomer. The latex solids were 26.3 percent (1958 grams), a polymer yield of 85.2 percent. The melt viscosity of the polymer was 10,142 poise at 100 reciprocal seconds.

EXAMPLES 3 AND 4

The procedure of Example 2 was substantially followed for two further batches except that in each of the Surflon S111S concentrated in the IPP emulsion was reduced to 0.15 weight percent of water. Polymerization time of each batch was 3 hours and 5 minutes providing an average polymerization rate of 112 grams per liter per hour with a maximum rate of 127 grams per liter per hour. Recovered latex had 27.2 and 26.1 percent solids respectively and the recovered polymer was 2,016 grams and 1947 grams respectively corresponding to yields of 86.8 and 84.7 percent respectively. The melt viscosity of the polymers was 9,249 and 9,033 poise at 100 reciprocal seconds.

Vinylidene Fluoride Polymers

The term "vinylidene fluoride polymer" used herein for brevity includes both normally solid, high molecular weight homopolymers and copolymers within its meaning. Such copolymers include those containing at least 50 mole percent of vinylidene fluoride copolymerized with at least one comonomer selected from the group consisting of tetrafluoroethylene, trifluoroethylene, chlorotrifluorethylene, hexafluoropropene, vinyl fluoride, pentafluoropropene, and any other monomer that would readily copolymerize with vinylidene fluoride. Particularly preferred are copolymers composed from at least 70 and up to 99 mole percent vinylidene fluoride, and correspondingly from 1 to 30 percent tetrafluoroethylene, such as disclosed in British Patent 827,308; and 70 to 99 percent vinylidene fluoride and 1 to 30 percent hexafluoropropene (see for example U.S. Pat. No. 3,178,399). Teropolymers of vinylidene fluoride, hexafluorpropene and tetrafluorethylene such as described in U.S. Pat. No. 2,968,649 are representative class of vinylidene fluoride copolymers which can be prepared by the process embodied herein.

Fluorosurfactants Useful in The Reactor

The identity of the fluorosurfactant useful as the emulsion stabilizer in the polymerization reactor is not critical. Suitable representative surfactants are those described in U.S. Pat. No. 2,559,752, e.g., acids of the formula $X(CF_2)_n COOH$ where n is an integer from 6 to 20, X is hydrogen and fluorine, and the alkali metal ammonium, amine, and quarterary ammonium salts thereof; the acids described in U.S. Pat. No. 3,239,970 of the formula $CF_2Cl-(CF_3)CF-(CF_2)_n COOH$ where n is an integer of 3 to 9, and the metal salts, ammonium salts, and acyl halies of said acids; the acids and salts thereof described in U.S. Pat. No. 3,311,566 and mixtures thereof, of the formula $Z(CHF_2)_n COOM$ where Z is fluorine or chlorine, and n an integer of 6 to 13 and M is hydrogen, and salts thereof of an alkali metal, or ammonia. The foregoing surfactants are meant to be illustrative of and not exclusive of fluoroalkyl surfactants, many others of which are known in the art and are operable as dispersion stabilizers in the preparation of vinylidene fluoride polymers in emulsion.

The Chain Transfer Agent

The use of a chain transfer agent is essential in the process of the present invention for molecular weight control of the product. While the conventional solvents useful for this purpose may be employed, the use of isopropyl alcohol (IPA) is preferred because it has no adverse effect on the stability of the reactor emulsion or on the polymerization rate. Furthermore, IPA is effective at relatively low concentrations, (from 0.1 to 1 weight percent and preferably from 0.2 to 0.6 weight percent of the total weight of monomer fed to the reactor) compared to the process of U.S. Pat. No. 3,857,827 where acetone in an amount of 1 to 20 weight percent based on monomer is recommended. Use of a relatively high ratio of acetone will create environmental problems due to air contamination on blow-down (in the absence of a solvent recovery system), a problem not experienced using IPA within the recommended ratio of IPA to monomer. There is a small initial charge of chain transfer agent to the reactor after the reactor is pressurized with monomer but before the initial charge of initiator to the system; once the polymerization commences (as will be evident from a drop of pressure in the system) the chain transfer agent is fed to the reactor simultaneously with the monomer and in the same relative volume increments as the monomer is being fed thereby providing the constant ratio of chain transfer agent to monomer previously noted.

The Initiator

The identify of the initiator (IPP) in the process of the present invention is critical as in the form in which it is introduced into the reactor, i.e. as an emulsion in deionized water containing from 5 to 10 weight percent emulsified IPP and from 0.1 to 1.0 weight percent fluorosurfactant (preferably from 0.15 to 0.3 weight percent) based on the weight of the initiator emulsion composition. Critical for the preparation of the initiator emulsion is that the fluorosurfactant has to be readily soluble in cold water. More specifically, the fluorosurfactant suitable for the preparation of the IPP emulsion has to dissolve in deionized water between 1° and 30° C. and at concentrations from 0.1 to 0.5 weight percent preferably from 0.15 to 0.3 weight percent of deionized water. Additional requirement of the fluorosurfactant is that it has to stabilize the IPP emulsion for at least the duration of a polymerization run which can take 1 to 8 hours preferably 2.0 to 4.5 hours. Representative of fluorosurfactants suitable for the preparation of IPP emulsions of this process are disclosed in U.S. Pat. No. 2,559,752, e.g., acids of the formula $X(CF_2)_n COOH$ where n is an integer from 6 to 20, preferred integer are from 7 to 11, X is hydrogen or fluorine and the alkaline metal or ammonium salts of such acids.

Polymerization Conditions

As is usual in vinylidene fluoride polymerization, before introduction of the monomer the reactor is subjected to a series of evacuations and nitrogen purges to ensure an oxygen-free environment for the polymerization. The reactor is then heated to the desired reaction temperature. The monomer is fed to the reactor to obtain the desired reaction pressure. The process is operable at pressures from about 300 to 1,000 psig preferably from 400 to 700 psig. Higher pressures than 1,000 psig may be used if the equipment will tolerate such pressures. After the monomer is charged, the initial charge of chain transfer agent is added to the reactor followed by the initiator (IPP) emulsion, fed incrementally or substantially continuously to the reactor together with feed of the monomer and chain transfer agent each through its own inlets. The progress of the polymerization is monitored by observation of the system's pressure which in turn is controlled by the rate of addition of monomer, chain tranfer agent and polymerization initiator.

The temperature of the polymerization reaction is critical to the success of the process. To ensure optimum yields and sufficient reaction rates, the reaction temperature is maintained in the range where the initiator half life is less than 30 minutes. Therefore, for the IPP initiated proess herein described, the temperature range is from 60° to 90° C., preferably between 70° and 80° C. The temperature is conveniently controlled by expeditious feed of a cooling medium to the jacket of the reactor. As stated previously, the pressure in the polymerization during the reaction will range from 300 to 1,000 psig, preferably from 400 to 700 psig.

The monomer or mixture of monomers, the initiator emulsion, and the chain transfer agent (isopropyl alcohol) are fed incrementally or substantially continuously to the reactor at the rate measured by the conversion of the monomer to polymer varying within the range of about 30 to 250 grams monomer converted per liter of reaction mixture per hour. The preferred reaction rates are from 100 to 150 grams per liter per hour. Total yield of polymer will generally be on the order of at least 90 to 95 percent.

The use of wax or a pure hydrocarbon oil as a component of the polymerization system is conventional. Any pure wax or hydrocarbon oil can be used.

Product Recovery

Upon completion of the reactor, or when the desired amount of monomer has been fed, the residual unreacted monomer is vented and the aqueous emulsion containing the vinylidene fluoride polymer is then recovered from the reactor; generally, this latex contains from about 10 to about 30 weight percent polymer solids. The polymer in the latex is in the form of small spheres having a size range of from about 0.1 to about 0.5 micron. When latex is the desired product, the dispersion recovered from the reactor may be further stabilized by the addition of stabilizing surfactants and further concentrated by known techniques such as creaming or flash evaporation. If a dry product is desired, the reactor latex is coagulated and the recovered polymer is washed and dried by known drying methods. The powdery product can be used for preparation of coatings or extruded into pellets for melt processing by extrusion, injection molding, and compression molding.

The molecular weight of the polymers may be gauged by determing the apparent melt viscosity which property is indicative also of melt processability. This can be done with the use of a capillary rheometer such as the Sieglaff-McKelvey capillary rheometer (product of Tinuis Olsen Testing Machine Company, Willow Grove, Pa.) with a capillary having an L/D (i.e., length over diameter) of 26, at 232° C. and 100 reciprocal second shear rate. The apparent melt viscosities of the vinylidene fluoride polymers produced herein range from 4,000 to 40,000 poise, preferably from 10,000 to 30,000 poise.

The fine powder can be redispersed in organic solvents or aqueous dispersions and these dispersions are especially suited for the preparation of protective coatings for substrates, being easily applied by spraying, brushing or dipping. The pelletized polymer can be fabricated into various forms by shaping techniques presently practiced in the art, e.g., extrusion, injection molding, and compression molding.

Many equivalent modifications of the above described process will be apparent to those skilled in the art without a departure from the inventive concept.

What is claimed is:

1. In a process for preparing high molecular weight vinylidene fluoride polymer by emulsion polymerization of monomer in a stirred aqueous reaction medium containing a fluoroalkyl surfactant emulsifier, the improvement which comprises using diisopropyl peroxydicarbonate as the polymerization initiator and isopropyl alcohol as the chain transfer agent and wherein monomer, initiator and chain transfer agent are added separately but simultaneously to the system, incrementally or continuously over the polymerization cycle, the initiator being added as the emulsified component of an aqueous emulsion in which a fluorosurfactant, readily soluble in cold water and capable of emulsifying the initiator for the duration of the polymerization is used.

2. The process of claim 1 wherein the fluorosurfactant used to emulsify the initiator is a surfactant of the formula $$X(CF_2)_nCOOH$$

wherein n is an integer from 6 to 20 and X is hydrogen or fluorine and salts thereof of alkali metals of ammonia.

3. The process of claim 2 wherein the initiator fed to the system is an emulsion in deionized water containing 0.1 to 0.5 percent by weight fluoro surfactant and 5 to 10 percent by weight of initiator, said percentages being based on the weight of said emulsion.

4. The process of claim 3 wherein the vinylidene fluoride polymer is the homopolymer of vinylidene fluoride.

5. The process of claim 2 wherein the chain transfer agent fed to the system is an aqueous solution containing from 1 to 10 percent by weight isopropyl alcohol, said percentage being based on the weight of said solution.

6. The process of claim 5 wherein the vinylidene fluoride polymer is the homopolymer of vinylidene fluoride.

7. The process of claim 6 wherein the polymerization is conducted at a temperature between 60° and 90° C. and at a pressure between 300 to 1000 psig.

8. The process of claim 2 wherein the vinylidene fluoride polymer contains up to 25 mol percentage tetrafluoroethylene.

9. The process of claim 2 wherein the vinylidene fluoride polymer contains up to 13 mol percentage hexafluoropropene.

* * * * *